United States Patent

[11] 3,601,225

| [72] | Inventors | Thomas V. Wahl, Jr.<br>North Pekin;<br>Ernest W. Landen, Peoria, both of, Ill. |
|---|---|---|
| [21] | Appl. No. | 16,059 |
| [22] | Filed | Mar. 3, 1970 |
| [45] | Patented | Aug. 24, 1971 |
| [73] | Assignee | Caterpillar Tractor Co.<br>Peoria, Ill. |

[54] PLASTIC FOAM CRANKSHAFT SEAL
3 Claims, 5 Drawing Figs.

[52] U.S. Cl. ................................................. 184/1 R,
55/486, 55/259, 55/522, 123/196 A, 184/6 G,
308/132, 277/32
[51] Int. Cl. ..................................................... F01m 1/10,
B01d 50/00
[50] Field of Search ........................................... 184/6 G, 1,
6 F; 277/32; 308/36.1, 132; 123/196 R, 196 S, 196
A; 55/486–489, 522, 524, 527, 528, 259; 184/11,
13, 6 D

[56] References Cited
UNITED STATES PATENTS

| 3,085,381 | 4/1963 | Sobeck.......................... | 55/527 X |
| 3,206,033 | 9/1965 | Kern Jr......................... | 55/522 |
| 3,289,953 | 12/1966 | Johnson et al. ............... | 184/1 X |
| 3,290,870 | 12/1966 | Jensen........................... | 55/486 |
| 3,308,610 | 3/1967 | Springer....................... | 55/522 X |
| 3,419,318 | 12/1968 | Harter.......................... | 308/132 |

*Primary Examiner*—Manuel A. Antonakas
*Attorney*—Fryer, Tjensvold, Feix, Phillips & Lempio ABSTRACT: A crankshaft seal comprises a foam member, positioned adjacent the crankcase and extending around the opening from which a portion of the crankshaft extends to function as a demister for oil vapor escaping from the crankcase. A wick member extends around the crankshaft adjacent the foam layer and returns oil to the crankcase.

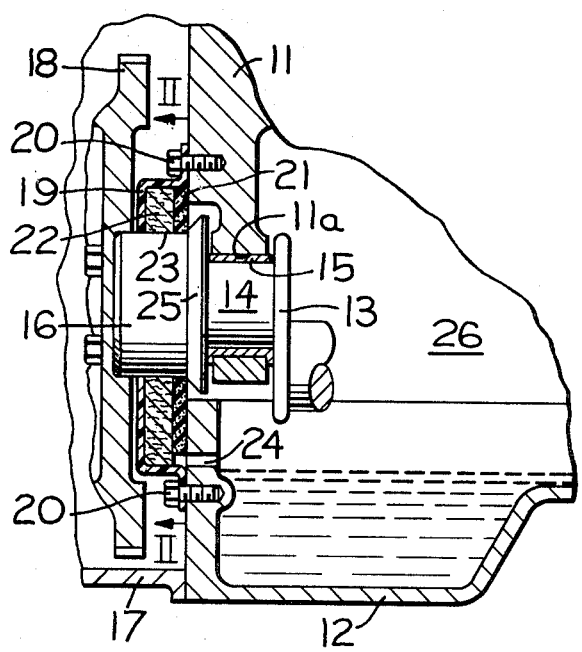
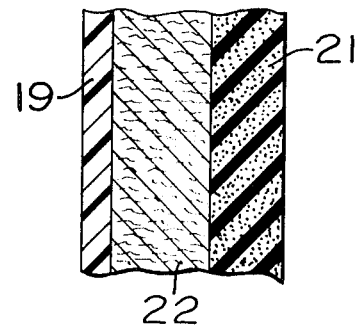
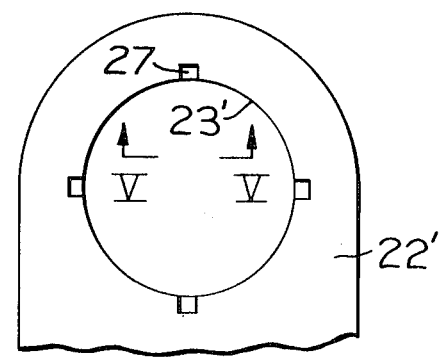
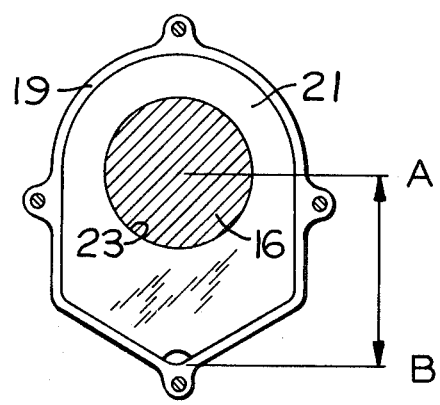
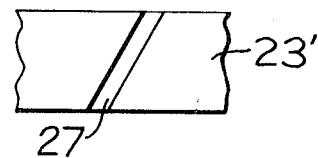

PLASTIC FOAM CRANKSHAFT SEAL

BACKGROUND OF THE INVENTION

The present invention is directed to seals and pertains more particularly to a crankshaft seal to prevent leakage of oil and fumes from the engine crankcase into the flywheel housing.

Internal combustion engines often employ a large diameter hub formed on one end of the crankshaft to connect to and support a flywheel. The periphery of the hub is often used as a surface against which a seal is placed to prevent crankcase oil and fumes from passing from the crankcase into the flywheel housing. The seal is often of either the lip type or the labyrinth type. The lip-type seal is generally satisfactory for low-speed engines where the surface velocity of the hub is low (e.g. 3,000–4,000 feet per minute). However, these seals are not generally satisfactory on high-speed engines where the surface velocity of the hub may reach as much as 9,000 feet per minute.

The labyrinth-type seal is generally satisfactory for high-speed surfaces if there is no pressure differential across the seal. Certain engines, especially single-cylinder engines, have rapidly fluctuating crankcase pressures due to piston reciprocation. Such engines cannot be satisfactorily sealed with the labyrinth-type seal.

SUMMARY OF THE INVENTION

It is a primary object of the present invention to provide a seal which overcomes the above problems of the prior art.

A further object of the present invention is to provide a crankshaft seal for high-speed engines.

A still further object of the present invention is to provide a seal for internal combustion engines having rapidly fluctuating crankcase pressures.

In accordance with the present invention a seal for an engine crankshaft is constructed of a polyurethane foam member positioned adjacent the crankcase with a felt member positioned between said foam member and the flywheel housing.

BRIEF DESCRIPTION OF THE DRAWINGS

The above and other objects and advantages of the present invention will become apparent from the following description when read in conjunction with the accompanying drawings in which:

FIG. 1 is a fragmentary view showing a sectional view of the main bearing of an engine embodying the present invention;

FIG. 2 is a view taken along lines II—II of FIG. 1;

FIG. 3 is a fragmentary sectional view showing the seal structure;

FIG. 4 is an end view of a portion of an alternate embodiment of the present invention;

FIG. 5 is a view generally along lines V—V of FIG. 4.

DETAILED DESCRIPTION OF THE DRAWINGS

Referring now to the drawings and especially to FIG. 1, there is illustrated the end wall 11 of a cylinder block of an engine which together with an oil pan 12 forms a crankcase housing 26. The crankcase encloses a crankshaft 13 which is rotatably supported at journal 14 by means of a main bearing 15 mounted in opening 11a in the cylinder block 11. The crankshaft 13 includes an enlarged hub 16 extending through opening 11a past the wall 11 into a flywheel housing 17. A flywheel 18 is attached in a conventional manner, such as by cap screws (not shown), to the hub 16.

A seal assembly including a housing 19 is attached such as by bolts 20 to the end wall 11 and oil pan 12. The seal housing 19 confines seal means in sealing engagement with the housing 11 and the hub 16. The sealing means comprises a demisting member 21 formed of foam material such as polyurethane, and a wick member 22 formed of a material such as felt. The felt member 22 is provided with an opening 23 of such diameter to surround and bear against hub 16. The foam member 21 is positioned between the felt member and the crankcase and functions as a demister for vapors from the crankcase. The wick member 22 is positioned behind the foam member and functions to transfer liquid downward and back through opening 24 to the oil pan. A slinger 25 is provided on crankshaft 13 for removing most of the oil from the crankshaft before it gets to the seal.

In operation, pressure in the crankcase 26 created by reciprocation of the pistons tends to transfer oil fumes from the crankcase to the flywheel housing. The slinger 25 catches and prevents a large portion of the liquid oil from reaching the seal as its conical shape tends to throw oil back toward crankcase 26. Oil vapor escaping past the slinger will enter the polyurethane foam member 21 where demisting occurs separating gas from liquid. Pressure in the crankcase forces the liquid from the foam member into the felt member where it drains downward and is returned to the oil pan 12 through a passage 24.

Hydrostatic pressure due to the height of a liquid column AB as shown in FIG. 2 will draw oil from location at height A to a location at height B where the oil will be drained off through the passage 24 back to the oil pan 12. Capillary action in the felt seal 22 will maintain oil at the surface of opening 23 to lubricate the seal and the crankshaft surface 16 to assure long seal life. Capillary action will tend to maintain the saturation of the felt for continuous liquid flow when required. Points at height A will always be less saturated than points at height B if drip-off is greater than oil supplied to the wick at points A. When the engine is not operating, hydraulic equilibrium is established in the wick which is determined by the hydrostatic pressure and capillary action.

Referring now to FIG. 4, there is illustrated a modified version of the wick member with like components identified by prime numbers. The member 22' is provided with a plurality of angular slots 27 cut within the opening 23' which act as wipers and tend to force the liquid forward to the crankcase via opening 24.

What is claimed is:

1. In combination with a crankcase housing, a crankshaft journaled in an opening in said housing and having a portion extending past said journal to the outside of said crankcase housing, a seal assembly surrounding said crankshaft adjacent said journal at said opening, the improvement comprising:

said seal assembly comprising a pair of sealing members surrounding said opening and said portion of said crankshaft and, housing means secured to said crankcase housing and confining said sealing members in engagement with said crankshaft;

said sealing members comprising a foam member adjacent said crankcase for demisting oil vapors from said crankcase; and, a wick member for conveying lubricating oil back to said crankcase.

2. The assembly as defined in claim 1 wherein:

said foam member is constructed of polyurethane foam; and said wick member is constructed of felt.

3. The assembly as defined in claim 2 wherein said wick member includes a plurality of slots extending along said crankshaft.